United States Patent [19]

Lewis

[11] 4,369,677
[45] Jan. 25, 1983

[54] TRANSMISSION THROTTLE PRESSURE REGULATOR ASSEMBLY

[75] Inventor: Charles W. Lewis, Wayne, Mich.

[73] Assignee: Ford Motor Company, Dearborn, Mich.

[21] Appl. No.: 165,883

[22] Filed: Jul. 3, 1980

[51] Int. Cl.³ .............................................. B60K 41/04
[52] U.S. Cl. ....................................... 74/869; 74/868; 137/625.69; 251/285
[58] Field of Search ................. 74/865, 866, 867, 868, 74/869; 137/625.69; 251/285

[56] References Cited

U.S. PATENT DOCUMENTS

| | | | |
|---|---|---|---|
| 2,759,456 | 8/1956 | Court | 121/38 |
| 3,327,554 | 6/1967 | Searles | 74/472 |
| 3,335,738 | 8/1967 | Christensen et al. | 137/102 |
| 3,491,786 | 1/1970 | Crossman et al. | 137/102 |
| 3,572,362 | 3/1971 | Pauliukonis | 137/102 |
| 3,747,626 | 7/1973 | Valentino | 137/102 |
| 3,831,494 | 8/1974 | Carre | 91/434 |
| 3,990,352 | 11/1976 | Nishida et al. | 91/434 |
| 4,008,630 | 2/1977 | Murakami et al. | 74/865 |

Primary Examiner—Allan D. Hartmann
Attorney, Agent, or Firm—Donald J. Harrington; Keith L. Zerschling

[57] ABSTRACT

A control system for an automatic power transmission for an automotive vehicle driveline comprising a throttle valve assembly for producing a pressure signal that is related in magnitude to the operator's demand for engine torque, said signal being used to regulate control pressure from a control pressure source and to trigger operation of automatic shift valves that in turn control actuation and release of the transmission clutches and brakes that effect ratio changes, the throttle valve system including a means for effecting an automatic manual adjustment of the operating pressure level for the throttle valve pressure signal thereby making it possible to effect a desired control pressure operating range and a desired shift point control for the control system.

6 Claims, 5 Drawing Figures

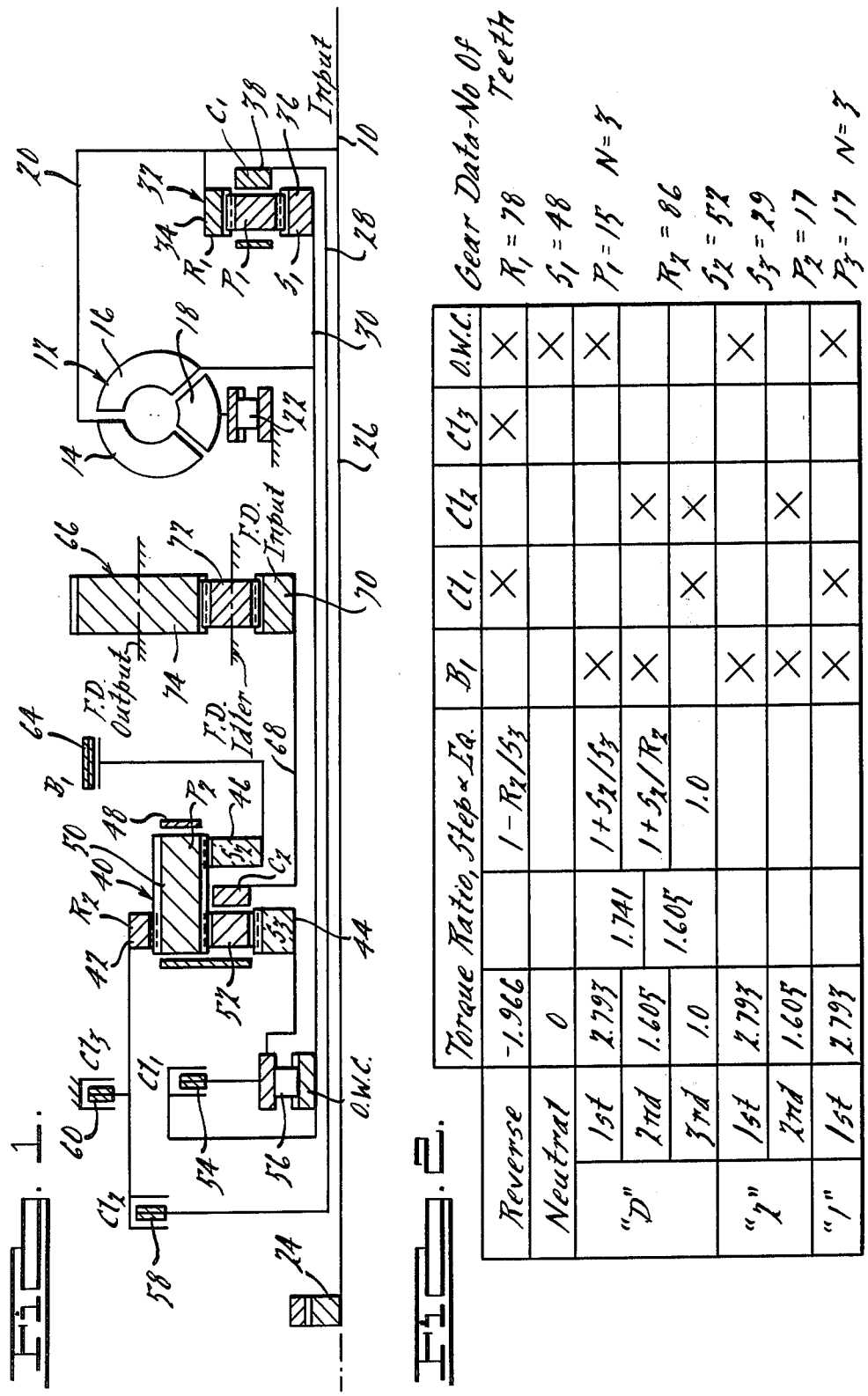

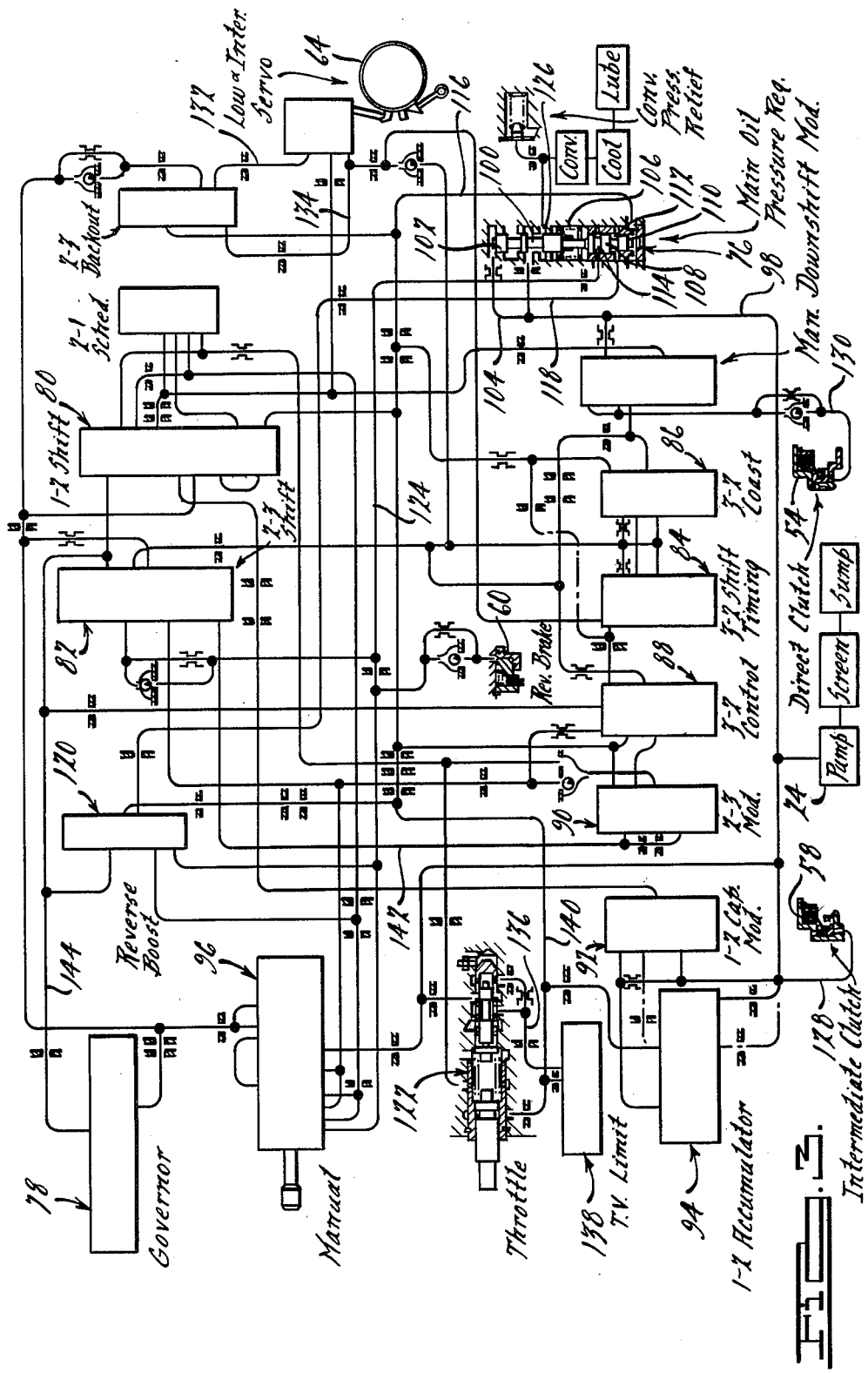

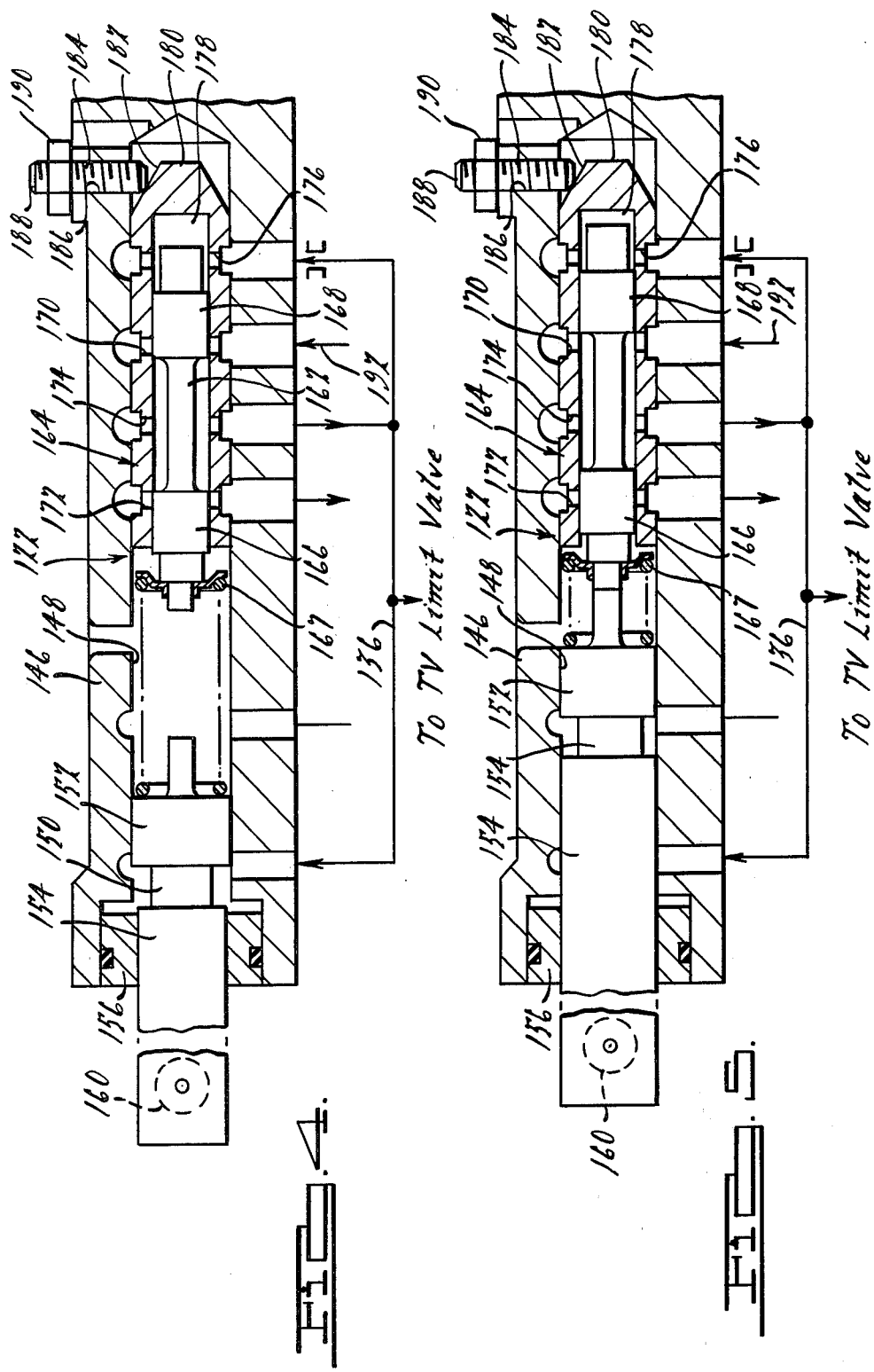

TRANSMISSION THROTTLE PRESSURE REGULATOR ASSEMBLY

GENERAL DESCRIPTION OF THE INVENTION

My invention comprises improvements in a throttle valve system for an automatic transmission such as that described in U.S. Pat. Nos. 3,327,554 and 4,008,630. Each of these patents discloses an automatic transmission having planetary gear elements that establish plural torque delivery paths between an internal combustion engine and a driven member, the traction wheels for the vehicle being connected to the driven member through a differential and driveshaft mechanism. A positive displacement pump driven by the engine establishes a control circuit pressure in control systems of the type disclosed in these references. The control circuit forms a connection between the pump and fluid pressure operated clutches and brakes that in turn control the relative motion of the gear elements of the mechanism thereby establishing a desired torque ratio.

The control circuit includes shift valves that control distribution of control pressure selectively to the clutches and brakes of the transmission whereby automatic ratio changes can be achieved. The shift valves respond to a speed signal made available by a fluid pressure governor driven by the driven shaft and to a torque demand pressure signal developed by the throttle valve mechanism. Thus the throttle valve mechanism influences the shift points during operation of the mechanism at varying speeds and road loads.

The control valve circuit includes also a pressure regulator that establishes the desired control pressure level. Provision is made for decreasing the magnitude of the regulated circuit pressure for any given torque demand as the vehicle speed increases. Provision is made also for increasing the regulated pressure made available by the regulator valve as torque demand increases. Thus the throttle valve mechanism controls both the shift points and the regulated circuit pressure.

The improved valve mechanism of my invention is capable of effecting a desired calibration adjustment of the throttle valve so that the operating throttle pressure signal can be maintained at a desired level to effect the optimum shift points and the optimum circuit pressure. This adjustment may be made manually without the necessity for disassembling the transmission. It may be made as a routine service adjustment to compensate for varying road conditions and for altitude changes depending upon the operating environment for a particular vehicle.

Other prior art references show the use of adjustable regulating valves of various kinds. Examples of such references are U.S. Pat. Nos. 3,990,352; 3,831,494; 3,747,626; 3,572,362; 3,491,786; 3,335,738 and 2,759,456. These references, however, do not disclose a compound valve mechanism capable of functioning as a throttle valve mechanism in an automatic control circuit for an automatic transmission although they each show the use of a regulating valve that comprises a spool operating within a sleeve and wherein provision is made for adjusting the sleeve in response to changing pressure in different parts of the control circuit or in response to changes in spring tension or valve controlled servo motor displacement.

BRIEF DESCRIPTION OF THE FIGURES OF THE DRAWINGS

FIG. 1 shows in schematic form a planetary power transmission mechanism that is capable of being used in an automotive vehicle driveline.

FIG. 2 is a chart showing the clutch and brake engagement and release pattern for the transmission mechanism of FIG. 1.

FIG. 3 is a schematic representation of a control circuit including the improved throttle valve mechanism of my invention for controlling the clutches and brakes of the transmission mechanism of FIG. 1.

FIG. 4 is a cross-sectional view of the throttle valve mechanism shown schematically in FIG. 3. The valve elements are positioned in FIG. 4 in their normal pressure regulating mode.

FIG. 5 is a view similar tto the view of FIG. 4 although it shows the valve elements in a position corresponding to a wide open engine throttle operating mode.

PARTICULAR DESCRIPTION OF THE INVENTION

In FIG. 1 I have shown in schematic form a power transmission mechanism of the kind described in a co-pending patent application filed by George E. Lemieux, Reginald T. Lewicki and Julius A. Clauss, entitled "Transaxle for a Vehicle Driveline", Ser. No. 134,240, filed Mar. 26, 1980. Reference may be made to that co-pending application for a particular description of a working embodiment of the transmission of FIG. 1.

Reference numeral 10 in FIG. 1 designates one end of an engine crankshaft for an internal combustion vehicle engine. Reference character 12 represents a hydrokinetic torque converter that comprises an engine driven bladed impeller 14, a bladed turbine 16 and a bladed stator 18, the impeller 14 being connected to the crankshaft 10 through a drive shell 20.

The impeller, the turbine and the stator are arranged in toroidal fluid flow relationship in known fashion, the stator 18 being mounted on a one way coupling 22 which prevents rotation of the stator in a direction opposite to the direction of rotation of the impeller but permits rotation in the direction of rotation of the impeller.

Crankshaft 10 is connected to a positive displacement pump 24 through a central shaft 26, the pump 24 serving as a pressure source for the control system to be described with reference to FIG. 3. A first torque input shaft 28 in the form of a sleeve surrounds the shaft 26. A second torque input shaft 30 in the form of a sleeve surrounds the shaft 28. A simple planetary torque splitter gear unit 32 is located in the converter drive shell 20 and it includes a ring gear 34 ($R_1$), a sun gear 36 ($S_1$), a carrier 38 ($C_1$) and planet pinions $P_1$ journalled rotatably on the carrier 38 and meshing with ring gear 34 and sun gear 36. Input sleeve shaft 28 is connected to the carrier 38 and input sleeve shaft 30 is connected to sun gear 36.

The main multiple ratio gearing for the mechanism of FIG. 1 is a compound planetary gear set 40 which comprises ring gear 42 ($R_2$), a small pitch diameter sun gear 44 ($S_3$), a large pitch diameter sun gear 46 ($S_2$), a compound planet carrier 48, long planet pinions 50 ($P_2$), and short planet pinions 52, the carrier 48 journalling rotatably the pinions 50 and 52. Sun gear 46 drivably engages pinions 50 and ring gear 42 drivably engages pinions 52 as well as ring gear 42. Pinions 52 also engage sun gear 44.

A first clutch 54, which also carries the symbol $CL_1$, is adapted to connect selectively sun gear 44 and sleeve shaft 30. Clutch 54 is actuated by a servo which will be described briefly with reference to FIG. 3. An overrunning coupling 56 is located in parallel disposition with respect to the clutch 54 and establishes a one way driving connection between shaft 30 and sun gear 44 during operation in the first forward driving ratio.

A second friction clutch 58 is adapted to connect selectively sleeve shaft 28 and ring gear 42. It is applied during second speed ratio operation and during third speed ratio operation. It is operated by a clutch servo as will be described briefly with reference to FIG. 3.

The ring gear 42 is adapted to be braked by friction brake 60 during reverse drive operation. Friction brake 60 is designated in FIG. 1 by reference symbol $CL_3$ and friction 58 is designated in FIG. 1 by symbol $CL_2$.

A friction brake band 64 is adapted to brake selectively large diameter sun gear 46. During first speed ratio operation and second speed ratio operation it is applied and released by a fluid pressure operated servo as will be described briefly with reference to FIG. 3.

A final drive and transfer gear mechanism is located between the compound planetary gearing 40 and the hydrokinetic torque converter 12 as indicated generally by reference character 66. A torque output sleeve shaft 68 connects the carrier 48 with a final drive input gear 70. A fixed idler 72 is mounted for rotation about a fixed axis so that it engages gear 70 as well as final drive output gear 74. Gear 74 in turn may be connected through a speed reduction gear and a differential and axle mechanism to each of two axle shafts in the automotive vehicle driveline.

In FIG. 2 I have shown a chart that summarizes the clutch and brake engagement and release pattern for the clutches and brakes shown schematically in FIG. 1. The symbols $B_1$, $CL_1$, $CL_2$, $CL_3$ and OWC designate the clutches and brakes that have corresponding symbols in FIG. 1. The left hand column of FIG. 2 shows the three ratios that are available in a first drive range D, the two drive ratios available for the drive range "2" and the single ratio that is available during drive range "1". The clutches and brakes are arranged horizontally in FIG. 1 and the symbol "X" in each instance designates engagement of a clutch or brake whereas a blank space designates the release condition of a clutch or brake.

In FIG. 3 I have designated very generally the principal elements of the control circuit for controlling the engagement and release of the clutches and brakes of FIG. 1. The pump 24, as seen in FIG. 3, supplies the main oil pressure regulator valve assembly 76 which establishes a regulated pressure level in the control circuit. The low speed brake 64, the intermediate clutch 58, the direct clutch 54 and the reverse brake 60 are supplied with fluid pressure from the pump 24 which is regulated by the regulator valve 76 through the various passages illustrated schematically in FIG. 3.

A governor valve assembly 78 driven by the shaft 68 supplies a speed signal pressure to the control system. That pressure is distributed through passages to a 1-2 shift valve 80 and a 2-3 shift valve 82 as well as to the various shift timing valves including the 3-2 shift timing valve 84 and the 3-2 coast control valve 86. A 3-2 downshift control valve 88 responds to throttle pressure to control the timing of the 3-2 downshift. The 2-3 upshift point is controlled in part by the operation of a 2-3 modulator valve 90. A 1-2 capacity modulator valve 92 controls the timing of the 1-2 upshift and the capacity of the intermediate clutch servo during the upshift mode. The 1-2 capacity modulator valve acts in cooperation with the 1-2 accumulator valve 94 to establish that function.

Manual valve 96 receives pressure from the pump 24 and distributes it to the various control circuit regions.

The regulator valve 76 receives output pressure from the pump 24 through passage 98. It comprises a regulator valve spool 100 having multiple lands that register with internal lands formed in a regulator valve bore 102. Passage 98 includes a feedback branch passage portion 104 which communicates with one side of the valve spool 100 to develop a pressure that opposes the force of the valve spring 106.

A pressure booster valve element 108 located in the lower portion of the valve bore 102 includes multiple lands which establish three pressure areas which are identified in FIG. 3 by reference numerals 110, 112 and 114, the pressure area 110 being subjected to a torque demand sensitive throttle pressure distributed to it through passage 116. The area 112 is subjected to a torque demand sensitive throttle pressure during reverse drive operation, the pressure being distributed to it through passage 118 which extends to reverse boost valve 120. Valve 120 establishes a connection between passage 118 and the throttle valve assembly 122 during reverse drive. An auxiliary pressure is distributed to area 114 through passage 124 when the manual valve 96 is moved to the reverse drive position so that an additional increase in regulated line pressure occurs during reverse drive.

Valve spool 100 establishes controlled communication between line pressure passage 98 and exhaust port 126 during its pressure regulation mode, the exhaust port 126 communicating with the converter inlet passage. The fluid pressure operated brake servo for operating the brake 64 and the clutch servos for operating the clutches 54 and 58 may be similar to the clutches and brakes described in prior art U.S. Pat. No. 3,327,554 mentioned previously in this specification. Clutch pressure for the clutch 58 is distributed through passage 128 and actuating pressure for the third speed ratio clutch 54 is distributed through passage 130. The servo for the brake 64 receives actuating pressure through passage 132 and it receives brake release pressure through passage 134.

Throttle pressure developed by the throttle valve assembly 122 is distributed through passage 136 to a pressure limit valve 138. This establishes a maximum value for the throttle pressure. The throttle pressure is distributed to the 1-2 shift valve 80 through the passage 140. A modulated 2-3 shift delay pressure is distributed through passage 142 to the 2-3 shift valve 82 from the 2-3 modulator valve 90.

The passage 128 which feeds the clutch 58 receives its actuating pressure from the 1-2 capacity modulator valve 92 which is supplied with circuit pressure from the 1-2 shift valve. The 1-2 accumulator 94 controls the timing of the application of the clutch 58 when the 1-2 shift valve is stroked to the upshift position.

Thus it is seen that the throttle valve assembly 122 controls both the shift points and the regulated circuit pressure. The influence of the throttle pressure on the shift valve is opposed by governor pressure made available to each of the shift valves 80 and 82 by the fluid connection 144 which extends to the governor 78. The calibration of the throttle valve assembly, therefore, is of importance because of its effect on shift timing as well as its effect on the roughness or harshness of the ratio shifts. The improvement of my invention makes it possible to establish the desired throttle pressure for any given vehicle installation so that the shift points will occur at the proper instant and so that the shift quality will be optimum.

For the purpose of describing more particularly the throttle valve system of my invention, reference will be made to FIGS. 4 and 5, the assembly of FIG. 4 showing the normal pressure regulating mode and the assembly of FIG. 5 showing the same structure in its wide open throttle operating mode.

The throttle valve assembly 122 includes the valve body 146 having a valve bore 148 in which is positioned a throttle plunger 150. The plunger 150 comprises two valve lands 152 and 154, the latter being smaller than the former so that a differential area is established between the lands. Land 154 is slidably received in a sleeve 156 located at one end of the valve bore 148. The outboard end of the land 154 is adapted to be connected to the engine carburetor throttle linkage through a suitable motion transmitting device which may include a roller cam follower 160 that is adapted to engage a driver controlled cam actuator, not shown. Upon advancement of the engine throttle, the plunger 150 is moved inwardly in a right hand direction as seen in FIG. 4.

A regulating valve element 162 is located on the right hand side of the plunger 150 and is slidably received in a valve sleeve 164. A throttle valve spring 166 connects the plunger 150 with the valve element 162, movement of the plunger 150 upon advancement of the engine carburetor throttle causing an increase in the spring compression force which is transmitted in turn to the valve element 162.

Valve element 162 comprises two spaced valve lands 166 and 168. These register with line pressure port 170 and exhaust port 172, respectively. A throttle valve pressure outlet port 174 in the sleeve 164 communicates with the interior of the sleeve between lands 166 and 168. A throttle pressure feedback port 176 formed in the sleeve 164 communicates with a throttle pressure feedback chambers 178 on the right hand end side of the land 168.

Sleeve 164 has a closed right hand end 180 which defines a cone surface 182. This cone surface is engaged by one end of a threaded adjusting member or set screw 184 which is received threadably in opening 186 of the valve body 146. The outboard end 188 of the set screw 184 is adapted to be engaged by a hand tool such as a screwdriver so that the set screw 184 can be adjusted inwardly and outwardly and then locked in place by a lock nut 190. Because of the camming action between the end of the set screw 184 and the cone surface 182, the sleeve 164 is adjusted axially. Movement of the set screw 184 inwardly causes leftward adjustment of the sleeve 164 and, conversely, movement of the set screw outwardly causes movement of the sleeve 164 in a right hand direction under the influence of throttle pressure in the chamber 178.

Throttle pressure ports 176 and 174 are connected to the previously described passage 136. Line pressure is distributed to the throttle valve assembly through passage 192 to the port 170. Thus for any given engine throttle setting, the modulating characteristic of the throttle valve assembly can be changed by appropriately adjusting the set screw 188. A reduced throttle pressure for any given setting occurs as the sleeve 164 is shifted in a left hand direction upon adjustment of the set screw 184.

An increase in throttle pressure occurs when the sleeve 164 is adjusted in the opposite direction.

Having described a preferred embodiment of my invention, what I claim and desire to secure by U.S. Letters Patent is:

1. In a control valve circuit for an automatic transmission having fluid pressure operated clutch and brake servos adapted to control the relative motion of gear elements of said transmission:

a throttle valve assembly comprising a valve body, a valve opening in said valve body;

a valve sleeve in said opening having a line pressure supply port, an exhaust port, a throttle valve pressure supply port and a throttle valve pressure feedback port;

a movable valve spool slidably disposed in said valve sleeve, said valve spool having spaced pressure regulating lands registering with said line pressure supply port and said exhaust port, said feedback port communicating with the interior of said sleeve at one end of said valve spool whereby the line pressure in said line pressure supply port is modulated;

a valve plunger in said opening, means for slidably positioning said plunger;

spring means between said plunger and the other end of said valve spool for exerting a variable force on said valve spool that is dependent upon plunger displacement;

and means for manually adjusting the position of said sleeve in said valve opening whereby the pressure modulating characteristic of said throttle valve assembly may be controlled.

2. In a control circuit for an automatic transmission in a driveline for a vehicle having a throttle controlled internal combustion engine, said transmission having fluid pressure operated clutch and brake servos adapted to control the relative motion of gear elements of said transmission;

a throttle valve assembly comprising a valve body, a valve opening in said valve body;

a pressure distributor shift valve means for controlling distribution of line pressure to said servos, a pressure regulator valve means adapted to control the operating pressure level of said line pressure;

a valve sleeve in said opening having a line pressure supply port, an exhaust port, a throttle pressure supply port and a throttle pressure feedback port;

said throttle pressure supply port being in fluid communication with said shift valve and with said pressure regulator valve means;

a movable valve spool slidably disposed in said valve sleeve, said valve spool having spaced pressure regulating lands registering with the ports in said sleeve whereby the line pressure in said line pressure supply port is modulated;

a valve plunger in said opening, means for slidably positioning said plunger;

spring means between said plunger and the other end of said valve spool for exerting a force on said spool upon displacement of said plunger that is opposed by the pressure force of the pressure in said throttle pressure feedback;

and means for manually adjusting the position of said sleeve in said valve opening whereby the pressure modulating characteristic of said throttle valve assembly may be controlled.

3. The combination as set forth in claim 1 wherein said adjusting means comprises a threaded adjusting member extending from said opening to a location on the exterior of said valve opening, said adjusting member being engageable with said valve sleeve whereby the position of said sleeve in said valve opening may be controlled by an adjustment of said adjusting member.

4. The combination as set forth in claim 3 wherein one part of said sleeve is formed with a cam surface, said cam surface being engageable with one end of said adjusting member.

5. The combination as set forth in claim 2 wherein said adjusting means comprises a threaded adjusting member extending from said opening to a location on the exterior of said valve opening, said adjusting member being engageable with said valve sleeve whereby the position of said sleeve in said valve opening may be controlled by an adjustment of said adjusting member.

6. The combination as set forth in claim 5 wherein one part of said sleeve is formed with a cam surface, said cam surface being engageable with one end of said adjusting member.

* * * * *

UNITED STATES PATENT AND TRADEMARK OFFICE
CERTIFICATE OF CORRECTION

PATENT NO. : 4,369,677
DATED : January 25, 1983
INVENTOR(S) : Charles W. Lewis

It is certified that error appears in the above-identified patent and that said Letters Patent are hereby corrected as shown below:

In Column 6, line 3, cancel "left" and substitute -- right --.

Signed and Sealed this

Seventh Day of February 1984

[SEAL]

Attest:

GERALD J. MOSSINGHOFF

Attesting Officer

Commissioner of Patents and Trademarks